United States Patent
Zhang et al.

(10) Patent No.: US 10,963,712 B1
(45) Date of Patent: Mar. 30, 2021

(54) SYSTEMS AND METHODS FOR DISTINGUISHING A DRIVER AND PASSENGERS IN AN IMAGE CAPTURED INSIDE A VEHICLE

(71) Applicant: BEIJING DIDI INFINITY TECHNOLOGY AND DEVELOPMENT CO., LTD., Beijing (CN)

(72) Inventors: Xiubao Zhang, Beijing (CN); Yukun Ge, Beijing (CN); Haifeng Shen, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/891,087

(22) Filed: Jun. 3, 2020

Related U.S. Application Data

(63) Continuation of application No. PCT/CN2019/125549, filed on Dec. 16, 2019.

(51) Int. Cl.
   *G06K 9/00* (2006.01)

(52) U.S. Cl.
   CPC ..... *G06K 9/00838* (2013.01); *G06K 9/00228* (2013.01)

(58) Field of Classification Search
   CPC ............. G06K 9/00288; G06K 9/3233; G06K 9/4604; G06K 9/6256
   See application file for complete search history.

(56) References Cited

U.S. PATENT DOCUMENTS

| | | | |
|---|---|---|---|
| 8,599,266 B2 | 12/2013 | Trivedi et al. | |
| 2019/0188878 A1 | 6/2019 | Matsuura | |
| 2019/0318152 A1 | 10/2019 | Aoi et al. | |

FOREIGN PATENT DOCUMENTS

| | | | |
|---|---|---|---|
| CN | 101032405 A | 9/2007 | |
| CN | 106394492 A | 2/2017 | |
| CN | 106570444 A | 4/2017 | |
| CN | 106709420 A | 5/2017 | |
| CN | 107341438 A | 11/2017 | |
| CN | 110532887 A | 12/2019 | |
| DE | 19822850 A1 | 11/1998 | |

(Continued)

OTHER PUBLICATIONS

Yin, Daquan, Real-time Detecting System of the Driver's Fatigue, Chinese Master's Theses Full-Text Database, 2006, 78 pages.

(Continued)

*Primary Examiner* — Sam Bhattacharya
(74) *Attorney, Agent, or Firm* — Metis IP LLC

(57) ABSTRACT

The present disclosure relates to a system and a method for distinguishing a driver and passengers in an image captured inside a vehicle. The system may perform the method to: obtain a face set from the image, the face set including at least one human face inside the vehicle and coordinates of the at least one human face; obtain a candidate driver face set from the face set based on the coordinates of the at least one human face, the candidate driver face set including at least one candidate driver face and coordinates of the at least one candidate driver face; and identify a target driver face from the at least one candidate driver face based on the coordinates of the at least one candidate driver face.

20 Claims, 9 Drawing Sheets

(56) References Cited

FOREIGN PATENT DOCUMENTS

JP        2008102752 A    5/2008
WO      03070093 A1    8/2003

OTHER PUBLICATIONS

International Search Report in PCT/CN2019/125549 dated Apr. 2, 2020, 4 pages.
Written Opinion in PCT/CN2019/125549 dated Apr. 2, 2020, 4 pages.
Extended European Search Report in European Application No. 19874773.5 dated Sep. 22, 2020, 10 pages.
First Examination Report in Australian Application No. 2019369206 dated Jan. 28, 2021, 5 pages.

500

```
┌─────────────────────────────────────────┐
│ Obtaining a face set from the image,    │
│ the face set including at least one     │──∿ 510
│ human face inside the vehicle and       │
│ coordinates of the at least one human   │
│ face                                    │
└─────────────────────────────────────────┘
                    ↓
┌─────────────────────────────────────────┐
│ Obtaining a candidate driver face set   │
│ from the face set based on the          │
│ coordinates of the at least one human   │──∿ 520
│ face, the candidate driver face set     │
│ including at least one candidate driver │
│ face and coordinates of the at least    │
│ one candidate driver face               │
└─────────────────────────────────────────┘
                    ↓
┌─────────────────────────────────────────┐
│ Identifying a target driver face from   │
│ the at least one candidate driver face  │──∿ 530
│ based on the coordinates of the at      │
│ least one candidate driver face         │
└─────────────────────────────────────────┘
```

```
┌─────────────────────────────────────────────────────────┐
│  Determining human faces other than the target driver   │ ～ 910
│       face in the face set as passenger faces           │
└─────────────────────────────────────────────────────────┘
                            │
                            ▼
┌─────────────────────────────────────────────────────────┐
│  Determining a passenger face of a passenger seating at │
│  a first officer's seat from the passenger faces based on│ ～ 920
│         the coordinates of the passenger faces          │
└─────────────────────────────────────────────────────────┘
```

FIG. 9

SYSTEMS AND METHODS FOR DISTINGUISHING A DRIVER AND PASSENGERS IN AN IMAGE CAPTURED INSIDE A VEHICLE

CROSS-REFERENCE TO THE RELATED APPLICATIONS

This application is a continuation of International Application No. PCT/CN2019/125549, filed on Dec. 16, 2019, the contents of which are hereby incorporated by reference.

TECHNICAL FIELD

This present disclosure generally relates to systems and methods for image processing, and in particular, to systems and methods for distinguishing a driver and passengers in an image captured inside a vehicle.

BACKGROUND

Images captured inside a vehicle often include faces of a driver and passengers. Recognizing the face of the driver and faces of the passenger (especially a face of a passenger seating at a first officer's seat of the vehicle) may be used for other applications. For example, the recognized faces may be further used for identifying a count of passengers, safety driving, such as preventing drivers from driving tiredly or distractedly, seat belt warning, etc. Therefore, it is desirable to provide systems and methods for distinguishing a driver and passengers in an image captured inside a vehicle quickly and accurately.

SUMMARY

An aspect of the present disclosure introduces a system for distinguishing a driver and passengers in an image captured inside a vehicle. The system may include at least one storage medium including a set of instructions for distinguishing the driver and the passengers in the image; and at least one processor in communication with the storage medium, wherein when executing the set of instructions, the at least one processor is directed to: obtain a face set from the image, the face set including at least one human face inside the vehicle and coordinates of the at least one human face; obtain a candidate driver face set from the face set based on the coordinates of the at least one human face, the candidate driver face set including at least one candidate driver face and coordinates of the at least one candidate driver face; and identify a target driver face from the at least one candidate driver face based on the coordinates of the at least one candidate driver face.

In some embodiments, to obtain the candidate driver face set, the at least one processor is directed to: obtain a width of the image; and determine the candidate driver face set based on the coordinates of the at least one human face and the width of the image.

In some embodiments, the coordinates of each of the at least one candidate driver face in the candidate driver face set satisfies:

$$xj_{bd} > \frac{w}{2}, j = 1, 2, \ldots, m,$$

wherein $xj_{bd}$ denotes an X-axis coordinate of a bottom right corner of each of the at least one candidate driver face, w denotes the width of the image, and m denotes a count of the at least one candidate driver face.

In some embodiments, to identify the target driver face from the at least one candidate driver face, the at least one processor is directed to: determine an area of each of the at least one candidate driver face based on the coordinates of the at least one candidate driver face.

In some embodiments, the at least one processor is further directed to: obtain a width and a height of the image; and determine a distance between a bottom right corner of each of the at least one candidate driver face and a bottom right corner of the image based on the coordinates of the at least one candidate driver face, the width of the image, and the height of the image.

In some embodiments, the at least one processor is directed to: determine a height of each of the at least one candidate driver face based on the coordinates of the at least one candidate driver face.

In some embodiments, the at least one processor is directed to: determine the target driver face based on the coordinates of each of the at least one candidate driver face, the area of each of the at least one candidate driver face, the distance between the bottom right corner of each of the at least one candidate driver face and the bottom right corner of the image, and the height of each of the at least one candidate driver face.

In some embodiments, the coordinates of the target driver face satisfies: $xj_{bd} > w*3/5$, wherein $xj_{bd}$ denotes an X-axis coordinate of a bottom right corner of the target driver face, and w denotes the width of the image.

In some embodiments, the area of the target driver faces is the largest in the candidate driver face set.

In some embodiments, the distance between the bottom right corner of the target candidate driver face and the bottom right corner of the image is the shortest in the candidate driver face set.

In some embodiments, the distance between the bottom right corner of the target candidate driver face and the bottom right corner of the image satisfies:

$$D_j^2 < \left(\frac{3}{4}h\right)^2,$$

wherein $D_j$ denotes the distance between the bottom right corner of the target candidate driver face and the bottom right corner of the image, and h denotes the height of the image.

In some embodiments, the height of the target driver face satisfies:

$$\frac{H_j}{h} > \frac{1}{6},$$

wherein $H_j$ denotes the height of the target driver face, and h denotes the height of the image.

In some embodiments, the at least one processor is further directed to: determine human faces other than the target driver face in the face set as passenger faces.

In some embodiments, the at least one processor is further directed to: determine a passenger face of a passenger seating at a first officer's seat from the passenger faces based on the coordinates of the passenger faces.

According to another aspect of the present disclosure, a method for distinguishing a driver and passengers in an image captured inside a vehicle. The method may include obtaining a face set from the image, the face set including at least one human face inside the vehicle and coordinates of the at least one human face; obtaining a candidate driver face set from the face set based on the coordinates of the at least one human face, the candidate driver face set including at least one candidate driver face and coordinates of the at least one candidate driver face; and identifying a target driver face from the at least one candidate driver face based on the coordinates of the at least one candidate driver face.

According to still another aspect of the present disclosure, a non-transitory computer-readable medium, comprising at least one set of instructions compatible for distinguishing a driver and passengers in an image captured inside a vehicle. When executed by at least one processor of an electrical device, the at least one set of instructions directs the at least one processor to perform a method. The method may include obtaining a face set from the image, the face set including at least one human face inside the vehicle and coordinates of the at least one human face; obtaining a candidate driver face set from the face set based on the coordinates of the at least one human face, the candidate driver face set including at least one candidate driver face and coordinates of the at least one candidate driver face; and identifying a target driver face from the at least one candidate driver face based on the coordinates of the at least one candidate driver face.

According to still another aspect of the present disclosure, a system for distinguishing a driver and passengers in an image captured inside a vehicle may include: a face set obtaining module, configured to obtain a face set from the image, the face set including at least one human face inside the vehicle and coordinates of the at least one human face; a candidate driver face set obtaining module, configured to obtain a candidate driver face set from the face set based on the coordinates of the at least one human face, the candidate driver face set including at least one candidate driver face and coordinates of the at least one candidate driver face; and a target driver face identifying module, configured to identify a target driver face from the at least one candidate driver face based on the coordinates of the at least one candidate driver face.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein:

FIG. 5 is a flowchart illustrating an exemplary process for distinguishing a driver and passengers in an image captured inside a vehicle according to some embodiments of the present disclosure;

FIG. 9 is a flowchart illustrating an exemplary process for determining a passenger face of a passenger seating at a first officer's seat according to some embodiments of the present disclosure.

DETAILED DESCRIPTION

Figure 1:
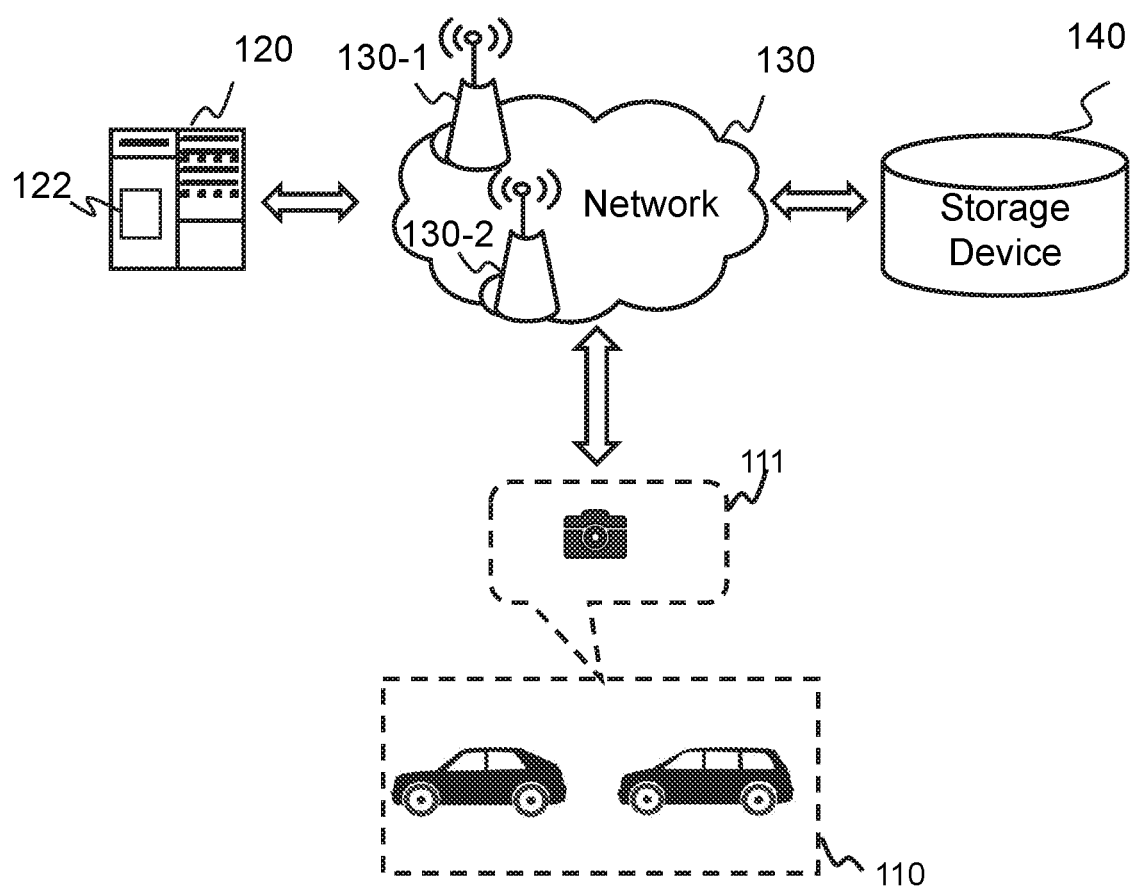
FIG. 1 is a schematic diagram illustrating an exemplary face distinguishing system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding distinguishing a driver and passengers in an image captured inside a vehicle, it should be understood that this is only one exemplary embodiment. The systems and methods of the present disclosure may be applied to any other kind of transportation system. For example, the systems and methods of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, or the like, or any combination thereof.

An aspect of the present disclosure relates to systems and methods for distinguishing a driver and passengers in an image captured inside a vehicle. The systems and methods may identify faces that appeared on the image and build a coordinate system on the image. The systems and methods may determine a face that satisfies all four conditions as a target driver's face. The four conditions are associated with coordinates of the face, an area of the face, a distance between the face and a corner of the image, and a height of the face, respectively. The systems and methods can further identify the face of a passenger who seats at a first officer's seat using the similar four conditions. In this way, the driver and the passengers on the image may be distinguished quickly and accurately. The recognized faces may be further used for identifying a count of passengers, safe driving, such as preventing drivers from driving tiredly or distractedly, seat belt warning, etc.

FIG. 1 is a schematic diagram illustrating an exemplary face distinguishing system 100 according to some embodiments of the present disclosure. In some embodiments, the face distinguishing system 100 may include a vehicle 110, a server 120, a network 130, and a storage device 140.

The vehicle 110 may be any type of vehicles. For example, the vehicle 110 may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof. In some embodiments, the vehicle 110 may have equivalent structures that enable the vehicle 110 to move around or fly. For example, the vehicle 110 may include structures of a conventional vehicle, for example, a chassis, a suspension, a steering device (e.g., a steering wheel), a brake device (e.g., a brake pedal), an accelerator, etc. As another example, the vehicle 110 may have a body and at least one wheel. The body may be any body style, such as a sports vehicle, a coupe, a sedan, a pick-up truck, a station wagon, a sports utility vehicle (SUV), a minivan, or a conversion van. The at least one wheel may be configured to as all-wheel drive (AWD), front wheel drive (FWR), rear wheel drive (RWD), etc. In some embodiments, it is contemplated that vehicle 110 may be an electric vehicle, a fuel cell vehicle, a hybrid vehicle, a conventional internal combustion engine vehicle, etc.

As shown in FIG. 1, the vehicle 110 may include a camera 111 inside the vehicle for sensing its inside or outside environment. The camera 111 may be configured to obtain one or more images relating to objects (e.g., a person, an animal, a tree, a roadblock, a building, or a vehicle) that are within the scope of the camera 111. For example, the camera 111 may be a car driving recorder mounted inside the vehicle 110. The camera 111 may be a front camera or a rear camera of the car driving recorder. As another example, the camera 111 may be a monitoring camera mounted inside the vehicle 110. As still another example, the camera 111 may be a user terminal (e.g., a mobile device, a tablet computer, a laptop computer, a built-in device in a vehicle, a wearable device) of a driver or a passenger inside the vehicle 110.

In some embodiments, the server 120 may be a single server or a server group. The server group may be centralized or distributed (e.g., the server 120 may be a distributed system). In some embodiments, the server 120 may be local or remote. For example, the server 120 may access information and/or data stored in the vehicle 110, the camera 111, and/or the storage device 140 via the network 130. As another example, the server 120 may be directly connected to the vehicle 110, the camera 111, and/or the storage device 140 to access stored information and/or data. In some embodiments, the server 120 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 120 may be implemented on a computing device 200 having one or more components illustrated in FIG. 2 in the present disclosure.

In some embodiments, the server 120 may include a processing device 122. The processing device 122 may process information and/or data associated with distinguishing a driver and passengers in an image captured inside a vehicle to perform one or more functions described in the present disclosure. For example, the processing device 122 may identify a target driver face based on coordinates on the image. As another example, the processing device 122 may identify a passenger face of a passenger seating at a first officer's seat. In some embodiments, the processing device 122 may include one or more processing engines (e.g., single-core processing engine(s) or multi-core processor(s)). Merely by way of example, the processing device 122 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set computer (RISC), a microprocessor, or the like, or any combination thereof. In some embodiments, the processing device 122 may be integrated into the vehicle 110.

The storage device 140 may store data and/or instructions. In some embodiments, the storage device 140 may store data obtained from the vehicle 110, the camera 111, the processing device 122, and/or an external storage device. For example, the storage device 140 may store image data obtained from the camera 111. As another example, the storage device 140 may store image data associated with a target driver face (or passenger faces). In some embodiments, the storage device 140 may store data and/or instructions that the server 120 may execute or use to perform exemplary methods described in the present disclosure. For example, the storage device 140 may store instructions that the processing device 122 may execute or use to distinguish a driver and passengers in an image. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 130 to communicate with one or more components (e.g., the server 120, the camera 111, and/or the vehicle 110) of the face distinguishing system 100. One or more components of the face distinguishing system 100 may access the data or instructions stored in the storage device 140 via the network 130. In some embodiments, the storage device 140 may be directly connected to or communicate with one or more components (e.g., the server 120, the camera 111, the vehicle 110) of the face distinguishing system 100. In some embodiments, the storage device 140 may be part of the server 120. In some embodiments, the storage device 140 may be integrated into the vehicle 110.

The network 130 may facilitate the exchange of information and/or data. In some embodiments, one or more components (e.g., the server 120, the camera 111, the vehicle 110, the storage device 140) of the face distinguishing system 100 may send information and/or data to other component(s) of the face distinguishing system 100 via the network 130. For example, the server 120 may obtain images from the vehicle 110 and/or the storage device 140 via the network 130. In some embodiments, the network 130 may be any type of wired or wireless network, or combination thereof. Merely by way of example, the network 130 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 130 may include one or more network access points. For example, the network 130 may include wired or wireless network access points (e.g., 130-1, 130-2), through which one or more components of the face distinguishing system 100 may be connected to the network 130 to exchange data and/or information.

Figure 2:
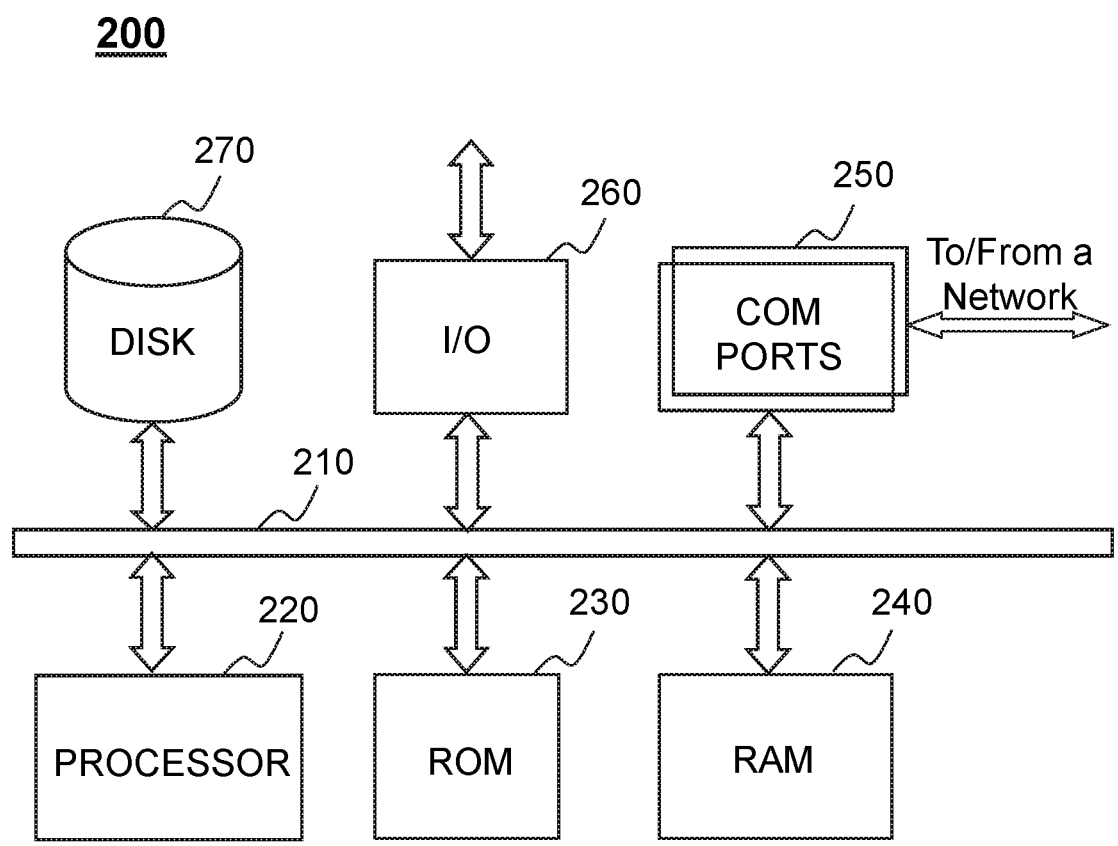
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device 200 according to some embodiments of the present disclosure. In some embodiments, the server 120 may be implemented on the computing device 200. For example, the processing device 122 may be implemented on the computing device 200 and configured to perform functions of the processing device 122 disclosed in this disclosure.

The computing device 200 may be used to implement any component of the face distinguishing system 100 of the present disclosure. For example, the processing device 122 of the face distinguishing system 100 may be implemented on the computing device 200, via its hardware, software program, firmware, or a combination thereof. Although only one such computer is shown for convenience, the computer functions related to the face distinguishing system 100 as described herein may be implemented in a distributed manner on a number of similar platforms to distribute the processing load.

The computing device 200 may include communication (COM) ports 250 connected to and from a network (e.g., the network 130) connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms, for example, a disk 270, and a read-only memory (ROM) 230, or a random access memory (RAM) 240, for various data files to be processed and/or transmitted by the computing device 200. The exemplary computing device 200 may also include program instructions stored in the ROM 230, the RAM 240, and/or another type of non-transitory storage medium to be executed by the processor 220. The methods and/or processes of the present disclosure may be implemented as the program instructions. The computing device 200 also includes an I/O component 260, supporting input/output between the computing device 200 and other components therein. The computing device 200 may also receive programming and data via network communications.

Merely for illustration, only one processor is described in the computing device 200. However, it should be noted that the computing device 200 in the present disclosure may also include multiple processors, and thus operations that are performed by one processor as described in the present disclosure may also be jointly or separately performed by the multiple processors. For example, the processor of the computing device 200 executes both operation A and operation B. As another example, operation A and operation B may also be performed by two different processors jointly or separately in the computing device 200 (e.g., the first processor executes operation A and the second processor executes operation B, or the first and second processors jointly execute operations A and B).

Figure 3:
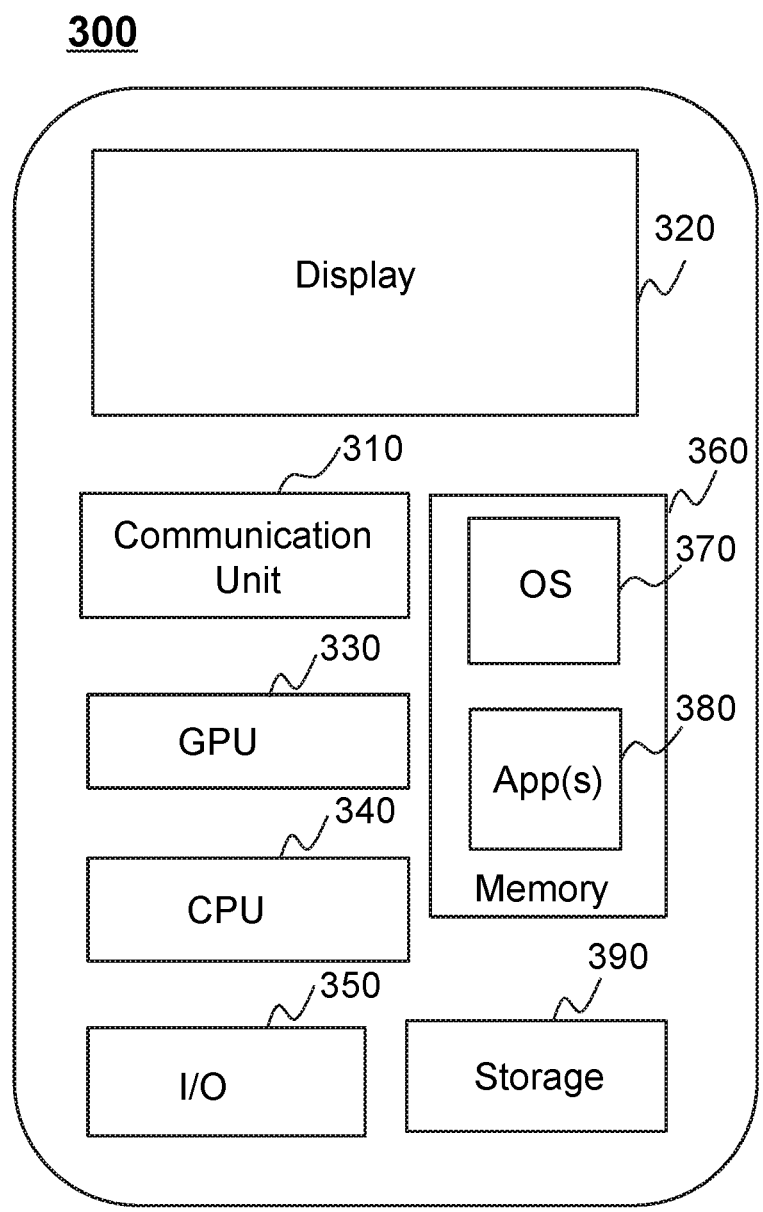
FIG. 3 is a schematic diagram illustrating exemplary hardware and/or software components of an exemplary mobile device on which a terminal device may be implemented according to some embodiments of the present disclosure.

FIG. 3 is a schematic diagram illustrating exemplary hardware and/or software components of an exemplary mobile device 300 on which a terminal device may be implemented according to some embodiments of the present disclosure. In some embodiments, the camera 111 may be implemented on the mobile device 300. As illustrated in FIG. 3, the mobile device 300 may include a communication platform 310, a display 320, a graphics processing unit (GPU) 330, a central processing unit (CPU) 340, an I/O 350, a memory 360, a mobile operating system (OS) 370, and storage 390. In some embodiments, any other suitable component, including but not limited to a system bus or a controller (not shown), may also be included in the mobile device 300.

In some embodiments, the mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile app for receiving and rendering information relating to positioning or other information from the processing device 122. User interactions with the information stream may be achieved via the I/O 350 and provided to the processing device 122 and/or other components of the face distinguishing system 100 via the network 130.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
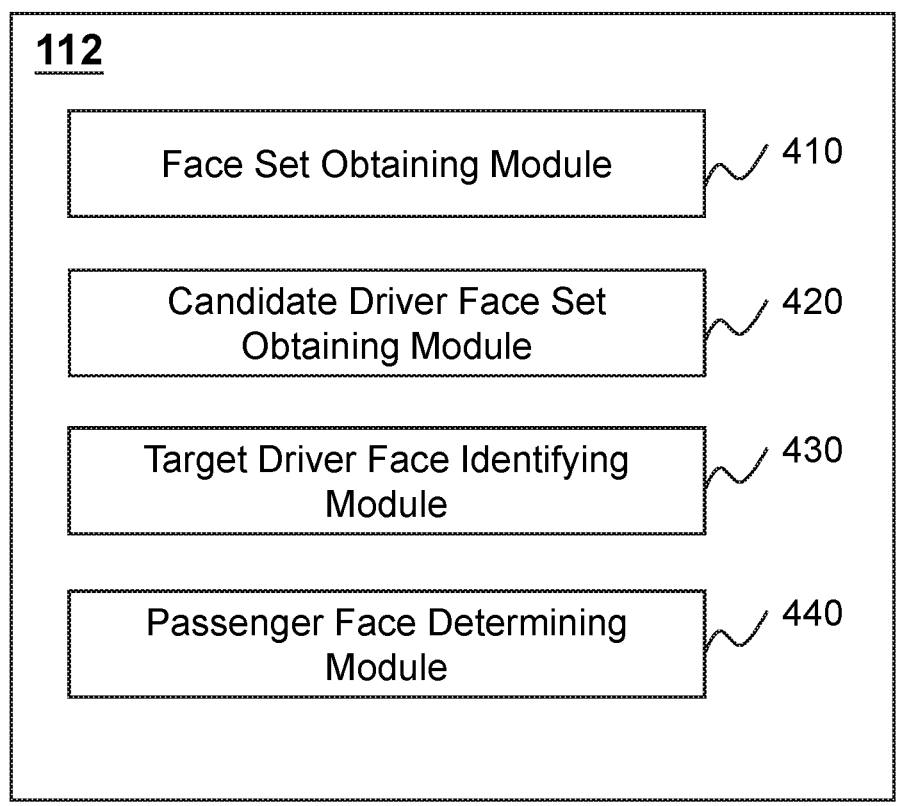
FIG. 4 is a block diagram illustrating an exemplary processing device according to some embodiments of the present disclosure.

FIG. 4 is a block diagram illustrating an exemplary processing device 122 according to some embodiments of the present disclosure. The processing device 122 may include a face set obtaining module 410, a candidate driver face set obtaining module 420, a target driver face identifying module 430, and a passenger face determining module 440.

The face set obtaining module 410 may be configured to obtain a face set from an image. For example, the face set obtaining module 410 may identify at least one human face from the image.

The candidate driver face set obtaining module 420 may be configured to obtain a candidate driver face set from the face set. For example, the candidate driver face set obtaining module 420 may determine the candidate driver face set based on the coordinates of the at least one human face and the width of the image.

The target driver face identifying module 430 may be configured to identify a target driver face from the at least one candidate driver face. For example, the target driver face identifying module 430 may determine an area of each of the at least one candidate driver face, a distance between the bottom right corner of each of the at least one candidate driver face and the bottom right corner of the image, and/or a height of each of the at least one candidate driver face. As another example, the target driver face identifying module 430 may determine the target driver face based on the coordinates of each of the at least one candidate driver face, the area of each of the at least one candidate driver face, the distance between the bottom right corner of each of the at least one candidate driver face and the bottom right corner of the image, and/or the height of each of the at least one candidate driver face.

The passenger face determining module 440 may be configured to determine passenger face(s) and/or a passenger face of a passenger seating at a first officer's seat. For example, the passenger face determining module 440 may determine human face(s) other than the target driver face in the face set as passenger face(s). As another example, the passenger face determining module 440 may determine the passenger face of the passenger seating at the first officer's seat based on the coordinates of the passenger face(s).

The modules in the processing device 122 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the processing device 122 may include a storage module (not shown) used to store information and/or data (e.g., the image, etc.) associated with distinguishing the driver and the passengers.

FIG. 5 is a flowchart illustrating an exemplary process 500 for distinguishing a driver and passengers in an image captured inside a vehicle according to some embodiments of the present disclosure. In some embodiments, the process 500 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

In 510, the processing device 122 (e.g., the face set obtaining module 410, the interface circuits of the processor 220) may obtain a face set from an image.

In some embodiments, the processing device 122 may obtain the image from the camera 111 mounted inside the vehicle 110. For example, the camera 111 may be a rear camera of a car driving recorder. The car driving recorder may be mounted at a front windshield of the vehicle 110. As another example, the camera 111 may be a road surveillance camera. When the vehicle 110 is moving on the road, the road surveillance camera may capture the image, including objects inside the vehicle 110. In some embodiments, the camera 111 may send the image to the processing device 122 in real-time after capturing the image. In some embodiments, the camera 111 may send the image to a storage (e.g., the storage device 140, the ROM 230, the RAM 240, etc.) of the face distinguishing system 100, and the processing device 122 may access the storage to obtain the image.

In some embodiments, the processing device 122 may communicate with the camera 111. For example, the processing device 122 may send an instruction for capturing the image to the camera 111 while the vehicle 110 is moving. In some embodiments, the camera 111 may capture the image automatically. For example, the camera 111 may automatically capture the image in some situations (e.g., the vehicle 110 is overspeeding, the vehicle 110 is conducting an abnormal order of a service, etc.). In some embodiments, the camera 111 may capture an image every predetermined time interval. For example, the camera 111 may capture an image every 5 minutes, 10 minutes, 30 minutes, etc.

In some embodiments, the face set may include at least one human face of a driver and/or passenger(s) seating inside the vehicle. In some embodiments, the processing device 122 may recognize the at least one human face from the image according to a face recognition algorithm. For example, the face recognition algorithm may include principal component analysis using eigenfaces, linear discriminant analysis, an elastic bunch graph matching using a Fisherface algorithm, a hidden Markov model, a multilinear subspace learning using tensor representation, and a neuronal motivated dynamic link matching, or the like, or any combination thereof.

In some embodiments, the face set may include coordinates of the at least one human face. In some embodiments, each of the at least one human face may be recognized as a shape (e.g., a square, a rectangular, etc.). In some embodiments, the processing device 122 may establish a coordinate system on the image. For example, the processing device 122 may establish the coordinate system with the top left corner of the image as the origin of the coordinate system. X-axis and Y-axis may be along a width direction and a length direction, respectively. The processing device 122 may determine the coordinates of each of the at least one human faces based on the recognized shape (e.g., a square, a rectangular, etc.) of each human face. For example, the processing device 122 may determine coordinates of each corner (e.g., a top left corner, a top right corner, a bottom left corner, and a bottom right corner) of the recognized rectangular of a human face as the coordinates of the human face.

In 520, the processing device 122 (e.g., the candidate driver face set obtaining module 420) may obtain a candidate driver face set from the face set based on the coordinates of the at least one human face. In some embodiments, the candidate driver face set may include at least one candidate driver face and coordinates of the at least one candidate driver face.

In some embodiments, a candidate driver face may be a face of a potential driver. In some embodiments, the processing device 122 may identify one or more candidate driver face from the face set based on the coordinates of the at least one human face. For example, the processing device 122 may identify one or more faces appear at the right half side of the image as potential driver(s). The right half side of the image may be determined based on a width of the image. For example, the processing device 122 may compare X-axis coordinates of each face (e.g., bottom right corner of the face, top right corner of the face, etc.) in the face set with a half value of the width of the image. If the X-axis coordinates of a face (e.g., bottom right corner of the face, top right corner of the face, etc.) is greater than the half value of the width of the image, the processing device 122 may determine that the face appears at the right half side of the image, and the face may be determined as a candidate driver face. In some embodiments, one or more candidate driver face may be included in the candidate driver face set together with the coordinates thereof. In some embodiments, the method for determining the candidate driver face set may be found elsewhere (e.g., FIG. 6 and the descriptions thereof) in the present disclosure.

In 530, the processing device 122 (e.g., the target driver face identifying module 430) may identify a target driver face from the at least one candidate driver face based on the coordinates of the at least one candidate driver face.

In some embodiments, the target driver face may be a face of a target driver who is driving the vehicle 110. In some embodiments, the processing device 122 may determine the target driver face based on the coordinates of the at least one candidate driver face in the candidate driver face set. For example, the processing device 122 may determine a face that satisfies one or more conditions as the target driver face. For example, the processing device 122 may determine a face that has an X-axis coordinate of a bottom right corner of the face satisfy a coordinate condition (e.g., the X-axis coordinate of the bottom right corner of the face is greater than 60 percent of the width of the image) as the target driver face. As another example, the processing device 122 may determine a face whose area is the largest among all the candidate driver faces as the target driver face. The area of the face may be determined based on coordinates of four corners of the face (in the rectangle shape). As still another example, the processing device 122 may determine a face that has the shortest distance from a corner of the image (e.g., a bottom right corner of the image) as the target driver face. As still another example, the processing device 122 may determine a face whose height satisfies a height condition (e.g., the height of the face is greater than a height threshold, a ratio of the height of the face to the height of the image is greater than a ratio threshold, etc.) as the target driver face. The height of the face may be determined based on coordinates of corners of the face (in the rectangle shape). As still another example, the processing device 122 may determine a face that satisfies some or all of the one or more conditions as the target driver face, according to predetermined criterions. In some embodiments, if there is not a human face satisfying all of the conditions (e.g., there are two human faces on the image, one human face satisfies three conditions and the other human face satisfies the other two conditions), the image may be sent to the operator of the system 100 for manually determining the driver face. In some embodiments, if there is not a human face satisfying all of the conditions, the processing device 122 may send an instruction to the driver of the vehicle to examine whether the camera is installed correctly. In some embodiments, the target driver face determined based on all of the conditions may be more accurate than the target driver face determined based on some of the one or more conditions. In some embodiments, the method for determining the target driver face may be found elsewhere (e.g., FIG. 8 and the descriptions thereof) in the present disclosure.

In some embodiments, the target driver face may be quickly and accurately identified according to the present disclosure. In some embodiments, the target driver face may be used for specific applications. For example, the target driver face may be used for safe driving to prevent the driver from driving tiredly or distractedly. As another example, the target driver face may be used for warning the driver to fasten the seat belt during driving the vehicle 110. As still another example, the target driver face may be used for personal identification of the driver.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 500. In the storing operation, the processing device 122 may store the identified target driver face in a storage (e.g., the storage device 140) disclosed elsewhere in the present disclosure. As another example, the processing device 122 may identify the target driver face from the at least one human face in the face set directly instead of obtaining the candidate driver face set.

Figure 6:
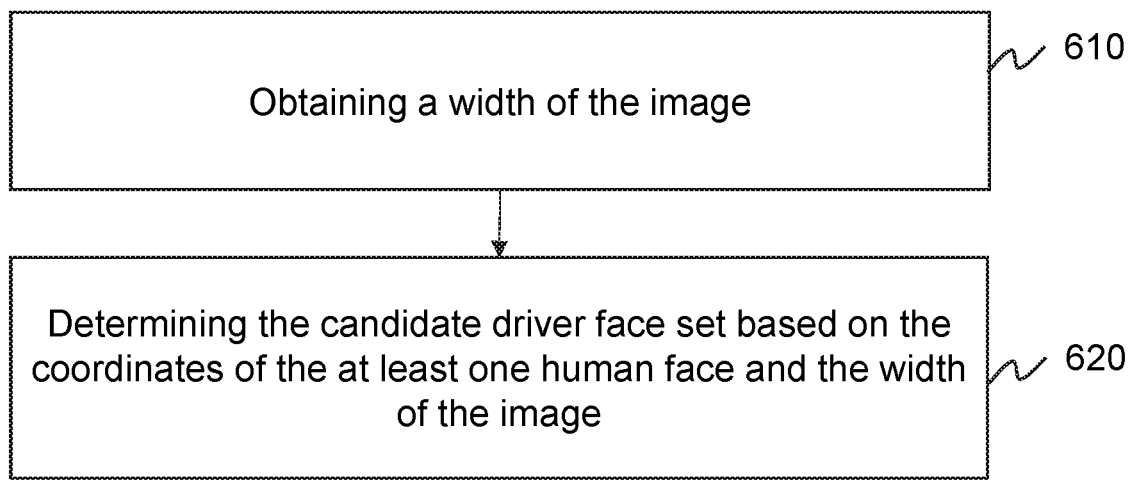
FIG. 6 is a flowchart illustrating an exemplary process for determining a candidate driver face set according to some embodiments of the present disclosure.

FIG. 6 is a flowchart illustrating an exemplary process 600 for determining a candidate driver face set according to some embodiments of the present disclosure. In some embodiments, the process 600 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations herein discussed. Additionally, the order in which the operations of the process as illustrated in FIG. 6 and described below is not intended to be limiting.

In 610, the processing device 122 (e.g., the candidate driver face set obtaining module 420) may obtain a width of the image.

Figure 7:
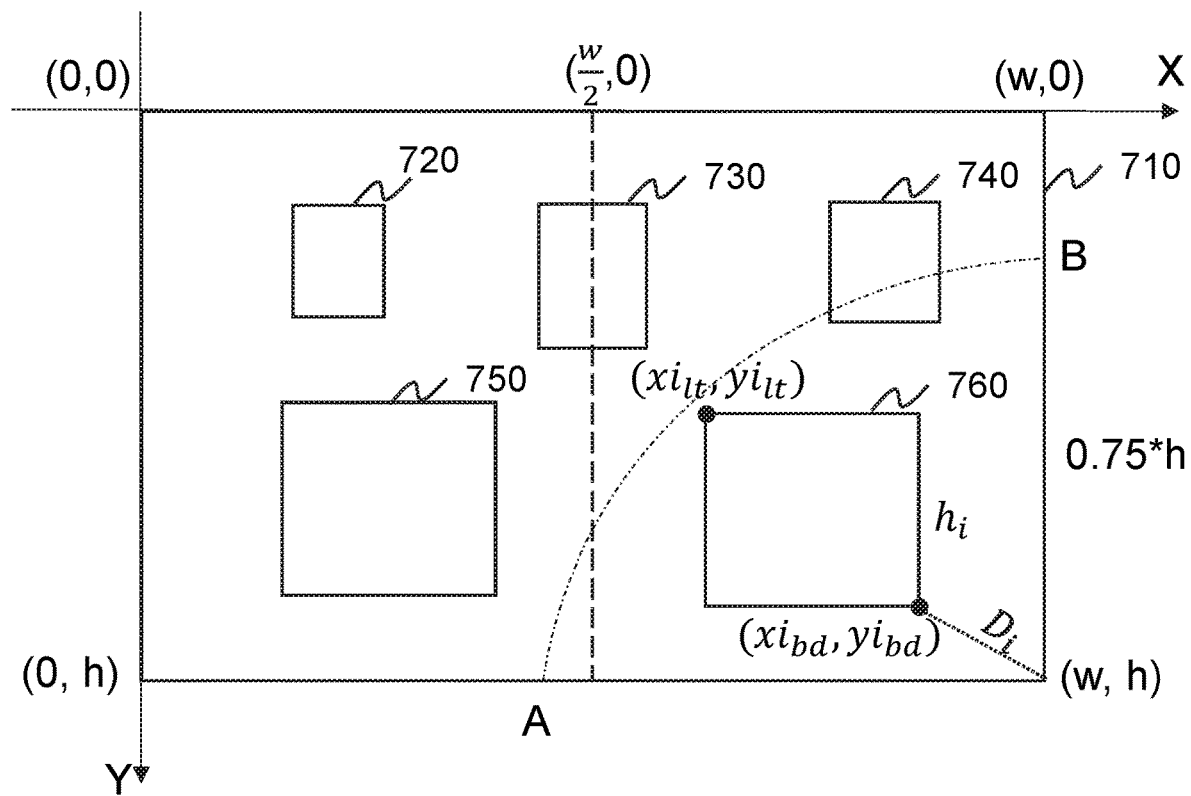
FIG. 7 is a schematic diagram illustrating an exemplary image captured inside a vehicle according to some embodiments of the present disclosure.

In some embodiments, the width of the image may indicate an X-axis coordinate of the top right corner of the image. FIG. 7 is a schematic diagram illustrating an exemplary image 710 captured inside a vehicle according to some embodiments of the present disclosure. As illustrated in FIG. 7, the X-axis coordinate of the top right corner of the image 710 is (w, 0). The top right corner of the image 710 may be the origin of the coordinate system, the width direction may be the X-axis direction, and the length direction may be the Y-axis direction. On the image 710, there may be five human faces 720, 730, 740, 750, and 760. As shown in FIG. 7, the width of the image 710 may be w. It should be noted that FIG. 7 is only illustrated for purposes. The coordinate system may be established on the image using another method. For example, any corner (e.g., the top left corner, the bottom left corner, the bottom right corner) of the image may be the origin of the coordinate system. As another example, the center of the image may be the origin of the coordinate system. The coordinates of the human face(s) in the image may be changed accordingly.

In 620, the processing device 122 (e.g., the candidate driver face set obtaining module 420) may determine the candidate driver face set based on the coordinates of the at least one human face and the width of the image.

In some embodiments, the vehicle 110 may be a left-hand-drive vehicle or a right-hand-drive vehicle. If the vehicle 110 is the left-hand-drive vehicle, the processing device 122 may identify one or more faces appear at right half side of the image as the candidate driver face(s). For example, the coordinates of each of the at least one candidate driver face in the candidate driver face set may satisfy the following condition (1):

$$xj_{bd} > \frac{w}{2}, j = 1, 2, \ldots, m, \quad (1)$$

wherein $xj_{bd}$ may denote an X-axis coordinate of a bottom right corner of each of the at least one candidate driver face, w may denote the width of the image, and m may denote a count of the at least one candidate driver face.

In some embodiments, the half value of the width of the image may be used to determine whether a face appears at one-half side of the image. As shown in FIG. 7, the human faces 730, 740, and 760 may be determined as the candidate driver face. The candidate driver face set may include the human faces 730, 740, and 760. If the vehicle 110 is the right-hand-drive vehicle, the processing device 122 may identify one or more faces appear at the left half side of the image as the candidate driver face(s). For example, the X-axis coordinate of a bottom left corner of each of the at least one candidate driver face in the candidate driver face set may be less than the half value of the width of the image. In some embodiments, the processing device 122 may determine the at least one candidate driver face included in the candidate driver face set by comparing the X-axis coordinate of each of human face (e.g., the X-axis coordinate of the bottom left corner or the bottom right corner) in the face set with the half value of the width of the image.

In some embodiments, the candidate driver(s) may be initially selected from the human faces inside the image according to the present disclosure to reduce computational cost for determining the target driver face. For example, the processing device 122 may determine the target driver face from the candidate driver face set rather than the face set obtained from the image.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 600. In the storing operation, the processing device 122 may store the width of the image or the candidate driver face set in a storage (e.g., the storage device 140) disclosed elsewhere in the present disclosure. As another example, the processing device 122 may determine the candidate driver face set based on the coordinates of the at least one human face and the height of the image. For example, the candidate driver face may appear at the bottom half side of the image.

Figure 8:
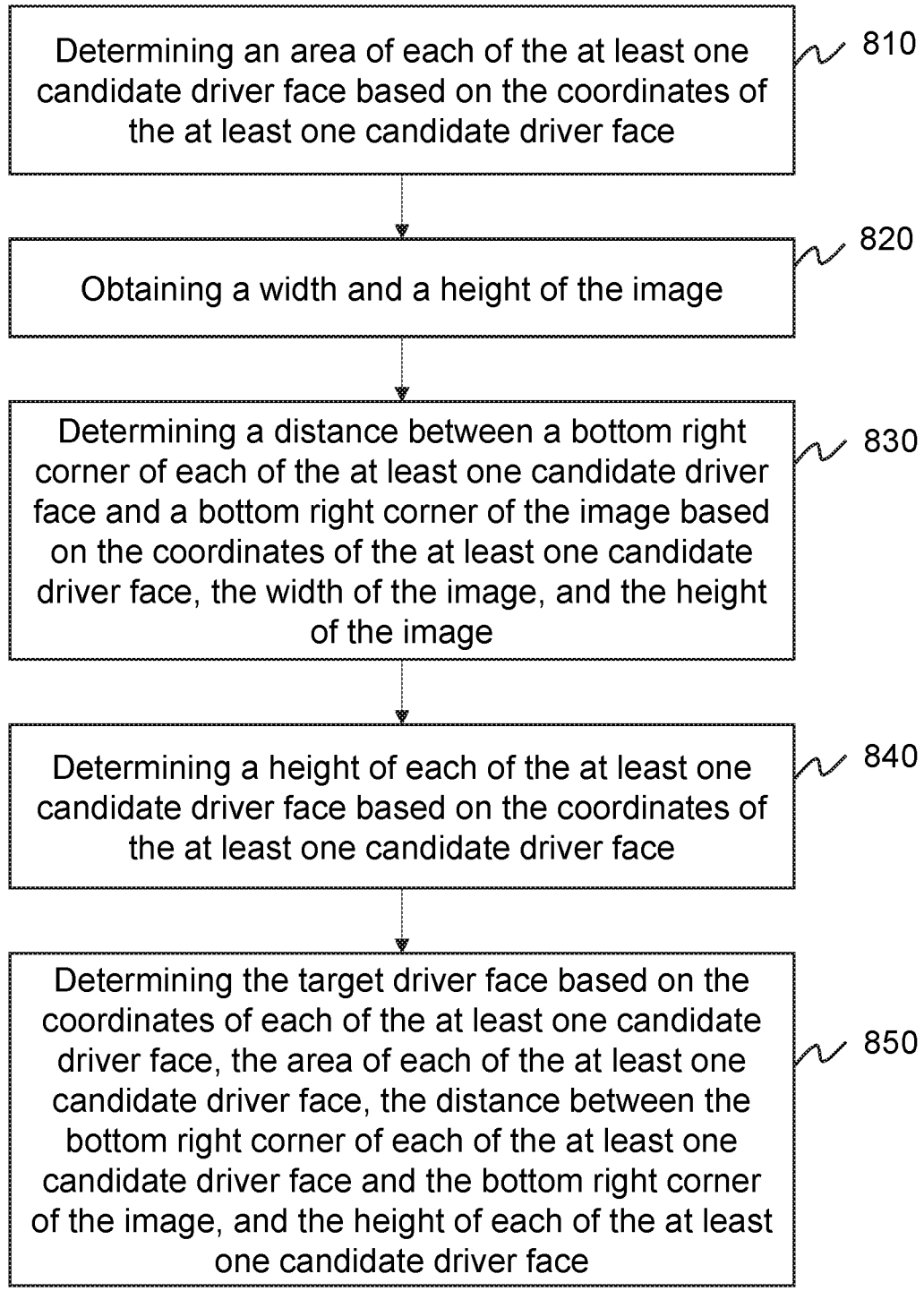
FIG. 8 is a flowchart illustrating an exemplary process for determining a target driver face according to some embodiments of the present disclosure.

FIG. 8 is a flowchart illustrating an exemplary process 800 for determining a target driver face according to some embodiments of the present disclosure. In some embodiments, the process 800 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 800. The operations of the illustrated process presented below are intended to be illustrative. In some embodiments, the process 800 may be accomplished with one or more additional operations not described and/or without one or more of the operations herein discussed. Additionally, the order in which the operations of the process as illustrated in FIG. 8 and described below is not intended to be limiting.

In 810, the processing device 122 (e.g., the target driver face identifying module 430) may determine an area of each of the at least one candidate driver face based on the coordinates of the at least one candidate driver face.

In some embodiments, the area of a face may indicate a size of the face. A face with a larger area may indicate that the face appears closer to the camera 111. For example, a face of a human seating in the front row of the vehicle 110 may have an area larger than a face of a human seating in the back row. In some embodiments, the processing device 122 may determine the area of each candidate driver face based on the coordinates of the candidate driver face. For example, as shown in FIG. 7, coordinates of a top left corner of the candidate driver face 760 is $(xi_{lt}, yi_{lt})$. The X-axis coordinate of the top left corner of the candidate driver face 760 is $xi_{lt}$ and the Y-axis coordinate of the top left corner of the candidate driver face 760 is $yi_{lt}$. Coordinates of a bottom right corner of the candidate driver face 760 is $(xi_{bd}, yi_{bd})$. The X-axis coordinate of the bottom right corner of the candidate driver face 760 is $xi_{bd}$ and the Y-axis coordinate of the bottom right corner of the candidate driver face 760 is $yi_{bd}$. The processing engine 112 may determine a width of the candidate driver face 760 as $|xi_{bd}-xi_{lt}|$, and a height of the candidate driver face 760 as $|yi_{bd}-yi_{lt}|$. The processing device 122 may determine the area of the candidate driver face 760 by multiplying the width and the height of the candidate driver face 760.

In 820, the processing device 122 (e.g., the target driver face identifying module 430) may obtain a width and a height of the image.

In some embodiments, the width of the image may indicate an X-axis coordinate of the top right corner of the image. The height of the image may indicate a Y-axis coordinate of the bottom left corner of the image. As shown in FIG. 7, the width of the image 710 may be w and the height of the image 710 may be h.

In 830, the processing device 122 (e.g., the target driver face identifying module 430) may determine a distance between a bottom right corner of each of the at least one candidate driver face and a bottom right corner of the image based on the coordinates of the at least one candidate driver face, the width of the image, and the height of the image.

In some embodiments, in the left-hand-drive vehicle, the driver seats at the front left of the vehicle, and the driver face appears at the bottom right of the image. In some embodiments, the distance between a bottom right corner of a candidate driver face and the bottom right corner of the image may be used to determine whether the candidate driver face appears at the bottom right of the image. In some embodiments, the bottom right of the image may represent a part near the bottom right corner and being at the lowest of the image. As shown in FIG. 7, the bottom right of the image may be an area shown in the arc $\overset{\frown}{AB}$. The distance from the point B to the bottom right corner of the image may be 0.75 h. In some embodiments, the processing device 122 may determine the distance between the bottom right corner of the candidate driver face and the bottom right corner of the image based on coordinates of the candidate driver face, the width of the image, and the height of the image. For example, as shown in FIG. 7, the distance $D_i$ between the bottom right corner of the candidate driver face 760 and the bottom right corner of the image 710 may be determined based on coordinates $(xi_{bd}, yi_{bd})$ of the bottom right corner of the candidate driver face 760 and the coordinates $(w, h)$ of the bottom right corner of the image 710. Wherein w and h may denote the width and height of the image 710, respectively. The distance $D_i$ may be determined according to $\sqrt{(xi_{bd}-w)^2+(yi_{bd}-h)^2}$.

It should be noted that the distance between the bottom right corner of a candidate driver face and the bottom right corner of the image is only for illustration purposes, other distances (e.g., a distance between a top right corner of the candidate driver face and the bottom right corner of the image, a distance between a bottom left corner of the candidate driver face and the bottom right corner of the image, etc.) may also be used to determine whether the candidate driver face appears at the bottom right of the image. It also should be noted that the left-hand-drive vehicle is only for illustration purposes, in the right-hand-drive vehicle, the processing device 122 may determine a distance between a bottom left corner of the candidate driver face and a bottom left corner of the image.

In 840, the processing device 122 (e.g., the target driver face identifying module 430) may determine a height of each of the at least one candidate driver face based on the coordinates of the at least one candidate driver face.

In some embodiments, the height of a candidate driver face may be used to determine a size of the candidate driver face or a height ratio of the candidate driver face to the image. For example, the driver seats at front of the vehicle, and the height of the driver face may be greater than a height threshold (or the height ratio of the driver to the image may be greater than a height ratio threshold). In some embodiments, the processing device 122 may determine the height of the candidate driver face based on the coordinates of the candidate driver face. For example, as shown in FIG. 7, the height $h_i$ of the candidate driver face 760 may be determined according to $|yi_{bd}-yi_{lt}|$.

In 850, the processing device 122 (e.g., the target driver face identifying module 430) may determine the target driver face based on the coordinates of each of the at least one candidate driver face, the area of each of the at least one candidate driver face, the distance between the bottom right corner of each of the at least one candidate driver face and the bottom right corner of the image, and the height of each of the at least one candidate driver face.

In some embodiments, the processing device 122 may determine a candidate driver face that satisfies one or more conditions associated with the coordinates of the candidate driver face, the area of the candidate driver face, the distance between the bottom right corner of the candidate driver face and the bottom right corner of the image, and/or the height of the candidate driver face as the target driver face.

In some embodiments, the coordinates of the target driver face may satisfy a coordinate condition. For example, an X-axis coordinate of a bottom right corner of the target driver face may be greater than a threshold value associated with the width of the image. In some embodiments, the threshold value may be a default value stored in a storage (e.g., the storage device 140, the ROM 230, the RAM 240, etc.) of the face distinguishing system 100. In some embodiments, the threshold value may be determined according to different application scenes or determined by an operator of the face distinguishing system 100. For example, the threshold value may be 50%, 60%, or 65%, etc., of the width of the image. In some embodiments, the coordinates of the target driver face may satisfy the following condition (2):

$$xj_{bd} > w*\tfrac{3}{5} \qquad (2),$$

wherein $xj_{bd}$ denotes an X-axis coordinate of a bottom right corner of the target driver face, and w denotes the width of the image.

In some embodiments, the area of the target driver face may satisfy an area condition. For example, the area of the target driver face may be the largest among the at least one candidate driver face in the candidate driver face set. As another example, the area of the target driver face may be greater than an area threshold. In some embodiments, the area threshold may be a default value stored in a storage (e.g., the storage device 140, the ROM 230, the RAM 240, etc.) of the face distinguishing system 100. In some embodiments, the area threshold may be determined according to different application scenes or determined by the operator of the face distinguishing system 100.

In some embodiments, the distance between the bottom right corner of the target driver face and the bottom right corner of the image may satisfy a distance condition. For example, the distance between the bottom right corner of the target driver face and the bottom right corner of the image may be less than a distance threshold. In some embodiments, the distance threshold may be a default value stored in a storage (e.g., the storage device 140, the ROM 230, the RAM 240, etc.) of the face distinguishing system 100. In some embodiments, the distance threshold may be determined according to different application scenes or determined by the operator of the face distinguishing system 100. As another example, the distance between the bottom right corner of the target driver face and the bottom right corner of the image may satisfy the following condition (3):

$$D_j^2 < \left(\frac{3}{4}h\right)^2, \quad (3)$$

wherein $D_j$ denotes the distance between the bottom right corner of the target candidate driver face and the bottom right corner of the image, and h denotes the height of the image.

In some embodiments, the height of the target driver face may satisfy a height condition. For example, the height of the target driver face may be greater than a height threshold. In some embodiments, the height threshold may be a default value stored in a storage (e.g., the storage device 140, the ROM 230, the RAM 240, etc.) of the face distinguishing system 100. In some embodiments, the height threshold may be determined according to different application scenes or determined by the operator of the face distinguishing system 100. For example, the height threshold may be 100, 120, 130, etc. As another example, the height of the target driver face may satisfy the following condition (4):

$$\frac{H_j}{h} > \frac{1}{6}, \quad (4)$$

wherein $H_j$ denotes the height of the target driver face and h denotes the height of the image.

In some embodiments, the processing device 122 may determine a candidate driver face that satisfies all of the conditions described in the operation 850 as the target driver face. For example, if there is not a human face satisfying all of the conditions (e.g., there are two human faces on the image, one human face satisfies three conditions and the other human face satisfies the other two conditions), the image may be sent to the operator of the system 100 for manually determining the driver face. In some embodiments, the processing device 122 may determine a candidate driver face that satisfies at least one of the conditions described in the operation 850 as the target driver face. For example, the processing device 122 may determine a candidate driver face that satisfies conditions (2), (3), and (4) as the target driver face. As another example, the processing device 122 may determine a candidate driver face that satisfies conditions (2) and (4) as the target driver face.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 800. In the storing operation, the processing device 122 may store the target driver face in a storage (e.g., the storage device 140) disclosed elsewhere in the present disclosure. As another example, the processing device 122 may determine the target driver face based on any combinations of the conditions described above.

FIG. 9 is a flowchart illustrating an exemplary process 900 for determining a passenger face of a passenger seating at a first officer's seat according to some embodiments of the present disclosure. In some embodiments, the process 900 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process as illustrated in FIG. 9 and described below is not intended to be limiting.

In 910, the processing device 122 (e.g., the passenger face determining module 440) may determine human faces other than the target driver face in the face set as passenger faces.

In some embodiments, the processing device 122 may delete the target driver face from the face set obtained from the image. The remaining human face(s) may be the passenger face(s).

In 920, the processing device 122 (e.g., the passenger face determining module 440) may determine a passenger face of a passenger seating at a first officer's seat from the passenger faces based on the coordinates of the passenger faces.

In some embodiments, in the left-hand-drive vehicle, the passenger seating at the first officer's seat may seat in the front of the vehicle 110 and at the right hand of the target driver. In some embodiments, the processing device 122 may determine the passenger face of the passenger seating at the first officer's seat based on the coordinates of the passenger faces. For example, the passenger face of the passenger seating at the first officer's seat may have the largest area among the passenger faces. The processing device 122 may determine an area of each passenger face, and determine a passenger face has the largest area as the passenger face of the passenger seating at the first officer's seat. As another example, the coordinates of the passenger face of the passenger seating at the first officer's seat may satisfy a condition similar to the condition (2). For example, the X-axis coordinate of a bottom left corner of the passenger face of the passenger seating at the first officer's seat may be less than 30%, 40%, or 45%, etc., of the width of the image. As still another example, the processing device 122 may determine a distance between a bottom left corner of each passenger face and the bottom left corner of the image. The distance between the bottom left corner of the passenger face of the passenger seating at the first officer's seat and the bottom left corner of the image may satisfy a condition similar to the condition (3). As still another example, the processing device 122 may determine a height of each passenger face. The height of the passenger face of the passenger seating at the first officer's seat may satisfy a condition similar to the condition (4).

In some embodiments, the processing device 122 determine a passenger face that satisfies all of the conditions described above as the passenger face of the passenger seating at the first officer's seat. For example, if there is not a human face satisfying all of the conditions (e.g., there are two passenger faces on the image, one passenger face satisfies three conditions and the other passenger face satisfies the other two conditions), the image may be sent to the operator of the system 100 for manually determining the passenger face of the passenger seating at the first officer's seat. In some embodiments, the processing device 122 may determine a passenger face that satisfies at least one of the conditions described above as the passenger face of the passenger seating at the first officer's seat.

In some embodiments, the processing device 122 may determine the passenger face of the passenger seating at the first officer's seat from the passenger faces directly from the face set obtained from the image according to similar method for determining the target driver face in the present disclosure. In some embodiments, the passenger face of the passenger seating at the first officer's seat may be quickly and accurately identified according to the present disclosure. In some embodiments, the passenger face of the passenger seating at the first officer's seat may be used for specific applications. For example, the passenger face of the passenger seating at the first officer's seat may be used for security. As another example, the passenger face of the passenger seating at the first officer's seat may be used for warning the passenger seating at the first officer's seat to fasten the seat belt. As still another example, the passenger face of the passenger seating at the first officer's seat may be used for personal identification of the passenger. In some embodiments, the passenger faces may be used to identify a count of passenger seating inside the vehicle 110 to prevent transporting excess passengers.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 900. In the storing operation, the processing device 122 may store the passenger faces in a storage (e.g., the storage device 140) disclosed elsewhere in the present disclosure. As another example, the processing device 122 may determine the passenger face of the passenger seating at a first officer's seat based on a similar method for determining the target driver face.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for distinguishing a driver and passengers in an image captured inside a vehicle, comprising:
   at least one storage medium including a set of instructions for distinguishing the driver and the passengers in the image; and
   at least one processor in communication with the storage medium, wherein when executing the set of instructions, the at least one processor is directed to:
      obtain a face set from the image, the face set including at least one human face inside the vehicle and coordinates of the at least one human face;
      obtain a candidate driver face set from the face set based on the coordinates of the at least one human face, the candidate driver face set including at least one candidate driver face and coordinates of the at least one candidate driver face;
      determine an area of each of the at least one candidate driver face based on the coordinates of the at least one candidate driver face;
      obtain a width and a height of the image;
      determine a distance between a bottom right corner of each of the at least one candidate driver face and a bottom right corner of the image based on the coordinates of the at least one candidate driver face, the width of the image, and the height of the image; and
      identify a target driver face from the at least one candidate driver face based on the area of each of the at least one candidate driver face and the distance between the bottom right corner of each of the at least one candidate driver face and the bottom right corner of the image.

2. The system of claim 1, wherein to obtain the candidate driver face set, the at least one processor is directed to:
   determine the candidate driver face set based on the coordinates of the at least one human face and the width of the image.

3. The system of claim 2, wherein the coordinates of each of the at least one candidate driver face in the candidate driver face set satisfies:

$$xj_{bd} > \frac{w}{2}, j = 1, 2, \ldots, m,$$

$xj_{bd}$ denotes an X-axis coordinate of a bottom right corner of each of the at least one candidate driver face, w denotes the width of the image, and m denotes a count of the at least one candidate driver face.

4. The system claim 1, wherein the at least one processor is directed to:
   determine a height of each of the at least one candidate driver face based on the coordinates of the at least one candidate driver face.

5. The system of claim 4, wherein the at least one processor is directed to:
   determine the target driver face based on the coordinates of each of the at least one candidate driver face, the area of each of the at least one candidate driver face, the distance between the bottom right corner of each of the at least one candidate driver face and the bottom right corner of the image, and the height of each of the at least one candidate driver face.

6. The system of claim 1, wherein the coordinates of the target driver face satisfies:

$$xj_{bd} > w * 3/5, \text{ wherein}$$

$xj_{bd}$ denotes an X-axis coordinate of a bottom right corner of the target driver face, and w denotes the width of the image.

7. The system of claim 1, wherein the area of the target driver faces is the largest in the candidate driver face set.

8. The system of claim 1, wherein the distance between the bottom right corner of the target candidate driver face and the bottom right corner of the image is the shortest in the candidate driver face set.

9. The system of claim 1, wherein the distance between the bottom right corner of the target candidate driver face and the bottom right corner of the image satisfies:

$$D_j^2 < \left(\frac{3}{4}h\right)^2,$$

wherein
   $D_j$ denotes the distance between the bottom right corner of the target candidate driver face and the bottom right corner of the image, and h denotes the height of the image.

10. The system of claim 5, wherein the height of the target driver face satisfies:

$$\frac{H_j}{h} > \frac{1}{6},$$

wherein
   $H_j$ denotes the height of the target driver face, and h denotes the height of the image.

11. The system of claim 1, wherein the at least one processor is further directed to:
   determine human faces other than the target driver face in the face set as passenger faces.

12. The system of claim 11, wherein the at least one processor is further directed to:
   determine a passenger face of a passenger seating at a first officer's seat from the passenger faces based on the coordinates of the passenger faces.

13. A method for distinguishing a driver and passengers in an image captured inside a vehicle, comprising:
   obtaining a face set from the image, the face set including at least one human face inside the vehicle and coordinates of the at least one human face;
   obtaining a candidate driver face set from the face set based on the coordinates of the at least one human face, the candidate driver face set including at least one candidate driver face and coordinates of the at least one candidate driver face;
   determining an area of each of the at least one candidate driver face based on the coordinates of the at least one candidate driver face;
   obtaining a width and a height of the image;

determining a distance between a bottom right corner of each of the at least one candidate driver face and a bottom right corner of the image based on the coordinates of the at least one candidate driver face, the width of the image, and the height of the image; and identifying a target driver face from the at least one candidate driver face based on the area of each of the at least one candidate driver face and the distance between the bottom right corner of each of the at least one candidate driver face and the bottom right corner of the image.

14. The method of claim 13, wherein the obtaining the candidate driver face set includes:

determining the candidate driver face set based on the coordinates of the at least one human face and the width of the image.

15. The method of claim 14, wherein the coordinates of each of the at least one candidate driver face in the candidate driver face set satisfies:

$$xj_{bd} > \frac{w}{2}, j = 1, 2, \ldots, m,$$

wherein $xj_{bd}$ denotes an X-axis coordinate of a bottom right corner of each of the at least one candidate driver face, w denotes the width of the image, and m denotes a count of the at least one candidate driver face.

16. The method of claim 13, further comprising:

determining a height of each of the at least one candidate driver face based on the coordinates of the at least one candidate driver face.

17. The method of claim 16, further comprising:

determining the target driver face based on the coordinates of each of the at least one candidate driver face, the area of each of the at least one candidate driver face, the distance between the bottom right corner of each of the at least one candidate driver face and the bottom right corner of the image, and the height of each of the at least one candidate driver face.

18. The method of claim 13, wherein the coordinates of the target driver face satisfies:

$xj_{bd} > w*3/5$, wherein $xj_{bd}$ denotes an X-axis coordinate of a bottom right corner of the target driver face, and w denotes the width of the image.

19. The method of claim 13, wherein the area of the target driver faces is the largest in the candidate driver face set.

20. A non-transitory readable medium, comprising at least one set of instructions for distinguishing a driver and passengers in an image captured inside a vehicle, wherein when executed by at least one processor of an electrical device, the at least one set of instructions directs the at least one processor to perform a method, the method comprising:

obtaining a face set from the image, the face set including at least one human face inside the vehicle and coordinates of the at least one human face;

obtaining a candidate driver face set from the face set based on the coordinates of the at least one human face, the candidate driver face set including at least one candidate driver face and coordinates of the at least one candidate driver face;

determining an area of each of the at least one candidate driver face based on the coordinates of the at least one candidate driver face;

obtaining a width and a height of the image;

determining a distance between a bottom right corner of each of the at least one candidate driver face and a bottom right corner of the image based on the coordinates of the at least one candidate driver face, the width of the image, and the height of the image; and identifying a target driver face from the at least one candidate driver face based on the area of each of the at least one candidate driver face and the distance between the bottom right corner of each of the at least one candidate driver face and the bottom right corner of the image.

* * * * *